May 24, 1949.  T. F. WORTH  2,471,182
DYNAMOELECTRIC MACHINE
Filed Nov. 19, 1947
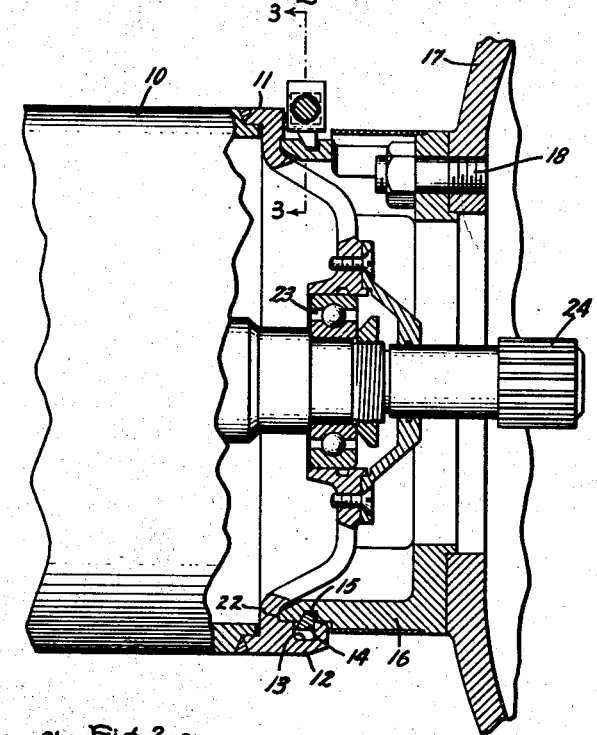
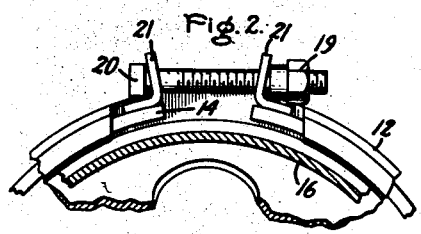
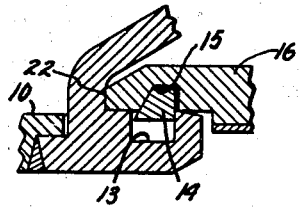
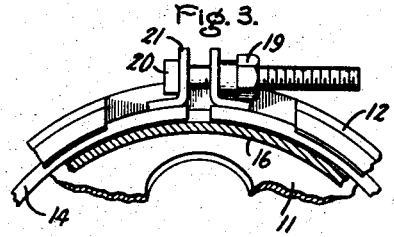
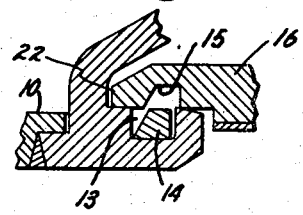
Inventor:
Thomas F. Worth,
by Crowell F. Mack
His Attorney.

Patented May 24, 1949

2,471,182

UNITED STATES PATENT OFFICE 2,471,182

DYNAMOELECTRIC MACHINE

Thomas F. Worth, Lynn, Mass., assignor to General Electric Company, a corporation of New York Application November 19, 1947, Serial No. 786,841

2 Claims. (Cl. 248—2)

My invention relates to improvements in dynamoelectric machines and more specifically to dynamoelectric machines adapted to be used as engine accessories.

Internal combustion engines such as those used for aircraft propulsion usually include an engine crankcase having one or more mounting flanges. An accessory, such as a dynamoelectric machine used as a generator, may be attached to such a flange by various known means but, because of the inaccessible and small space generally provided around an aircraft engine, problems are usually encountered in mounting such an accessory. For example, means should be provided to allow maximum freedom of rotation of the accessory for installation, servicing and removal, while, at the same times, rotation restraining means must be provided for normal operation. In the past satisfying these requirements has resulted in complicated and cumbersome devices having parts expensive to manufacture, hard to get at when assembled, and apt to get lost when disassembled. In addition, such parts have, in the past, failed to provide rapid assembly, disassembly, and adjustment of the accessory at any point around the circumference of the mounting flange.

It is an object of this invention to provide simple and inexpensive means for overcoming these difficulties.

A further object of this invention is to provide means which allow quick disconnection or positioning of an accessory at any point around the circumference of its mounting flange.

Broadly the means employed in the embodiment herein illustrated and described comprise a resilient split ring which is made to be an internal part of an aircraft generator and which coacts with a groove within the generator housing and a mating groove on a mounting flange associated with an aircraft propulsion engine. By wedge action between a tapered side of the split ring and a tapered side of the groove in the mounting flange, the accessory is clamped to the engine when the split ring is drawn together as by tightening a nut.

Further objects and advantages of my invention will become apparent and my invention will be better understood from consideration of the following description taken in connection with the accompanying drawing.

In the drawing, Fig. 1 is a side elevational view, partly in section, of a dynamoelectric machine such as an aircraft generator attached to an engine mounting flange through means suitably embodying my invention and including a split ring; Fig. 2 is an end view showing, in a disengaged position, the clamping means used to draw together the split ring; Fig. 3 is a view along lines 3—3 of Fig. 1 showing the same clamping means drawn together; Fig. 4 is an enlarged sectional view of the ring and associated parts clamped as seen at the bottom of Fig. 1; and Fig. 5 is a similar view showing the ring in the open position.

Referring now to Fig. 1, I have shown an aircraft generator housing 10 provided with an end bell portion 11 which supports anti-friction bearing 23 and in turn the splined shaft 24 of the dynamoelectric machine. The splines of this shaft in turn engage splines (not shown) on a crankshaft of the aircraft propulsion engine. End bell 11 is provided with an annular flange portion 12 having an inner periphery provided with a circumferential groove 13. Flange portion 12 and groove 13 do not extend completely around the machine as they are cut off at one portion of the circumference (at the top as viewed in Fig. 1) to provide clearance for clamping-ring assembly and movement hereinafter described. Located within groove 13 is the clamping ring 14 made of a resilient material such as spring steel. As shown in Fig. 2, ring 14 is a split ring having drawing-together means such as nut 19 and bolt 20 engaging angle members 21 fastened, as by welding, to the ends of the ring. With the drawing-together means loosened, as in Fig. 2, the ring springs outward into the groove 13 associated with the dynamoelectric machine, and with the drawing-together means tightened, as in Fig. 3, ring 14 partially leaves the slot 13 (as shown in Fig. 1) and engages a mating groove 15 provided in an outer periphery of a mounting flange 16 which in turn is suitably secured to the aircraft engine crankcase housing 17 as by means of stud and nut assemblies such as that shown at 18.

I find it desirable to provide a tapered side on both the split ring 14 and the corresponding adjacent surface of groove 15 in the mounting flange 16. By means of these tapered sides and by abutment of the flange against the end bell (as at point 22 on the mounting flange) the dynamoelectric machine is very firmly clamped to the mounting flange when the split ring is drawn together.

From Fig. 2 it is obvious that with the drawing-together means loosened, ring 14 springs outward so that it is entirely located in the groove associated with the accessory and entirely out of the groove 15 associated with the engine. This is shown more clearly in Fig. 5, which is a sectional view of the ring and associated parts.

With the drawing-together means (such as nut 19 and bolt 20) tightened, the split ring 14 firmly engages the tapered groove 15 of the engine mounting flange 16 to firmly clamp the accessory to the engine, as shown in Figs. 1 and 2 and in Fig. 4 which is a sectional view of the ring and associated parts with the ring drawn together.

With the device described the accessory may be quickly attached to the engine and just as quickly detached therefrom. In addition, the accessory may be readily rotated to any desired position around the circumference of the mounting flange and firmly clamped in that position. The split ring is internally located with respect to the accessory and, when the clamping arrangement is released, the resilient split ring expands returning to its original preshaped form. Thus when the accessory is removed from the engine the clamping ring is in an out-of-the-way position and there is little possibility of the clamping parts becoming lost or mislaid. In addition, there is an efficient utilization of the small space available around the conventional aircraft engine.

There is thus provided a device of the character described capable of meeting the objects hereinabove set forth and there is provided an inexpensive and simple but efficient and readily adjustable clamping means for a dynamoelectric machine used as an accessory for a gasoline engine.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A dynamoelectric machine having a flanged end portion, a circumferentially extending groove in an inner periphery of said flanged end portion, a split ring of springlike material located within said groove, said ring having a tapered side, a mounting flange for said dynamoelectric machine, said mounting flange having a circumferentially extending groove having a tapered side adapted to cooperate with the tapered side of said split ring, and means for clamping together the ends of said split ring, whereby said ring may be caused to enter said second-mentioned groove and firmly attach said dynamoelectric machine to said mounting flange at any desired rotational position.

2. A dynamoelectric machine adapted to be used as an accessory for an aircraft engine, said dynamoelectric machine having a flanged end portion, said aircraft engine having a flanged portion adapted to receive said flanged end portion of said dynamoelectric machine, said aircraft engine flanged portion having an axially outer extremity adapted to abut against an annular portion of said flanged end portion and having a peripheral groove having a tapered side, said flanged end portion having a corresponding circumferential groove, a split ring of spring steel having a tapered side adapted to cooperate with the tapered side of said first-mentioned groove, and means for alternately tightening or loosening said split ring to cause it to alternately occupy both or one of said grooves, whereby said dynamoelectric machine may be readily attached to or detached from said aircraft engine.

THOMAS F. WORTH.

REFERENCES CITED

The following references are of record in the file of this patent:

UNITED STATES PATENTS

| Number | Name | Date |
|---|---|---|
| 1,063,926 | Schuermann | June 3, 1913 |
| 2,368,537 | Gilbert | Jan. 30, 1945 |
| 2,440,452 | Smith | Apr. 27, 1948 |